United States Patent [19]

Hoeffel et al.

[11] Patent Number: 4,854,156

[45] Date of Patent: Aug. 8, 1989

[54] PNEUMATIC SURFACE-FOLLOWING CONTROL SYSTEM

[75] Inventors: James D. Hoeffel, Centerville; Richard E. Elliott; Wally C. Hoppe, both of Dayton; James S. Nevitt, Bellbrook, all of Ohio

[73] Assignee: Systems Research Laboratories, Inc., Dayton, Ohio

[21] Appl. No.: 292,789

[22] Filed: Jan. 3, 1989

[51] Int. Cl.$^4$ .............................................. G01B 13/04
[52] U.S. Cl. .................................. 73/37.5; 33/DIG. 2
[58] Field of Search ..................... 73/37.5, 37.6, 37.7; 33/DIG. 2

[56] References Cited

U.S. PATENT DOCUMENTS

| | | | |
|---|---|---|---|
| 3,495,442 | 2/1970 | Rejsa | 73/37.6 |
| 3,802,086 | 4/1974 | Walker | 73/37.5 |
| 3,884,076 | 5/1975 | Studer | 73/37.6 |
| 4,325,249 | 4/1982 | Berglung | 73/37.6 |

*Primary Examiner*—Hezron E. Williams
*Attorney, Agent, or Firm*—Biebel, French & Nauman

[57] ABSTRACT

An apparatus for maintaining the end of a probe carrying a sensor, such as an eddy current probe, a predetermined distance from a workpiece includes a housing in which a piston is permitted to move. Air under pressure, introduced into a first chamber formed within the housing, acts on a first surface of the piston to urge it toward the workpiece. An air bearing is used to permit the almost friction free axial movement of the piston within the housing. Some of the air passes from the first chamber through a restricted opening in the piston into a second chamber and is vented toward the workpiece. The pressure in the second chamber will vary as a function of the distance of the end of the probe to the workpiece surface. The piston is provided with a second, larger, surface area exposed to the variable pressure in the second chamber, and as a result, the piston is urged away from the workpiece. The pressures acting in the two surfaces work together to maintain the piston, and the sensor, a constant distance from the workpiece.

6 Claims, 2 Drawing Sheets

PNEUMATIC SURFACE-FOLLOWING CONTROL SYSTEM

BACKGROUND OF THE INVENTION

This invention relates to an improved surface following device using pneumatic pressure to maintain a probe a constant distance from the surface of a workpiece. This invention is particularly useful in maintaining an eddy current coil a specified distance from a metallic workpiece whose surface configuration is irregular.

Eddy current probes must be kept a constant distance from the surface of the workpiece under inspection if the measurements are to be a useful indication of the quality of that surface. This is a difficult task especially when the surface of the workpiece, such as a turbine rotor plate, is irregular.

Prior art eddy current probes currently used for noncontact inspections of engine parts use compressed air as a cushion to force the tip of the probe away from the part surface. The lift-off distance is sensitive to probe tip area and configuration tolerances. Variation in area changes the lift-off distance, resulting in variability among probes of the same type. Small probe tip areas, needed for inspecting parts with small radii, develop a reduced air cushion that results in low (or no) lift-off; thus, the probe tip touches the part more frequently during inspection, and wears out more quickly. Clearly, there is a need for a probe to follow the part surface with a constant lift-off distance, independent of surface area. Some attempts at using a closed-loop control system were tried, but the response was too slow due to the inertia of moving mechanical components much larger than a probe tip.

SUMMARY OF THE INVENTION

In the present invention, gas, such as air under pressure is introduced into a chamber containing a piston, the exterior portion of which carries a measuring coil or other device. This pressure, acting on the piston, urges the piston toward the workpiece. A small portion of this air is permitted to vent between the piston and its housing to form an air bearing which permits the almost friction free axial movement of the piston. A porous bearing member is installed on the piston to provide the principal air bearing support of the piston within the probe. Some of the air is passed into a plenum through a restricted opening, and the air in this plenum is directed toward the workpiece. The pressure within a plenum will vary as a function of this distance due to the back pressure created by the proximity of the surface. The further away the surface, the less the pressure. The piston carrying the eddy current coil, or other measuring device, has a second surface area exposed to this variable or second pressure, and as a result, the piston is urged away from the workpiece. These two factors, working together, maintain the piston, and the measuring coil, a constant distance from the workpiece.

It is therefore an object of this invention to provide an improved pneumatic surface following sensor using an air jet as a position sensor and not as an air cushion. With this invention, the surface area at the probe end of the piston may be varied from one instrument to another since the surface area is not critical to maintaining a constant distance. It is also another object of this invention to provide a probe where the difference of pressure acting on the piston itself is the principal force maintaining the piston at the correct distance from the workpiece. It is a further object of this invention to provide a probe of the type described wherein a porous bearing member is a principal part of the air bearing supporting the piston within the probe.

It is a still further object of this invention to provide an apparatus for maintaining the end of a probe a predetermined distance from a workpiece, said apparatus comprising a hollow housing including means for forming first and second chambers therein and means for introducing a gas under pressure into said first chamber, a piston positioned within said housing, said piston having one end thereof provided with a first surface having a first area exposed to said first chamber, whereby the pressure of the gas in said first chamber acts on said first area to urge the piston toward the workpiece, means forming an orifice between said first chamber and said second chamber for permitting a restricted flow of the gas to pass into said second chamber thereby permitting the pressures in said chambers to be different, means on said piston forming a second surface having a second area, larger than said first surface, exposed to the gas in said second chamber, means forming a sensing port at the probe end of said piston for directing a stream of the gas from said second chamber toward the workpiece whereby the pressure of gas in said second chamber will be function of the distance between the probe end of said piston and the workpiece, whereby the piston will assume a position within said housing where the force acting on the first surface balance the force acting on the second surface, thus maintaining the probe end of the piston a constant distance from the workpiece.

Other objects and advantages of the invention will be apparent from the following description, the accompanying drawings and the appended claims.

DESCRIPTION OF THE PREFERRED EMBODIMENT

Figure 1:
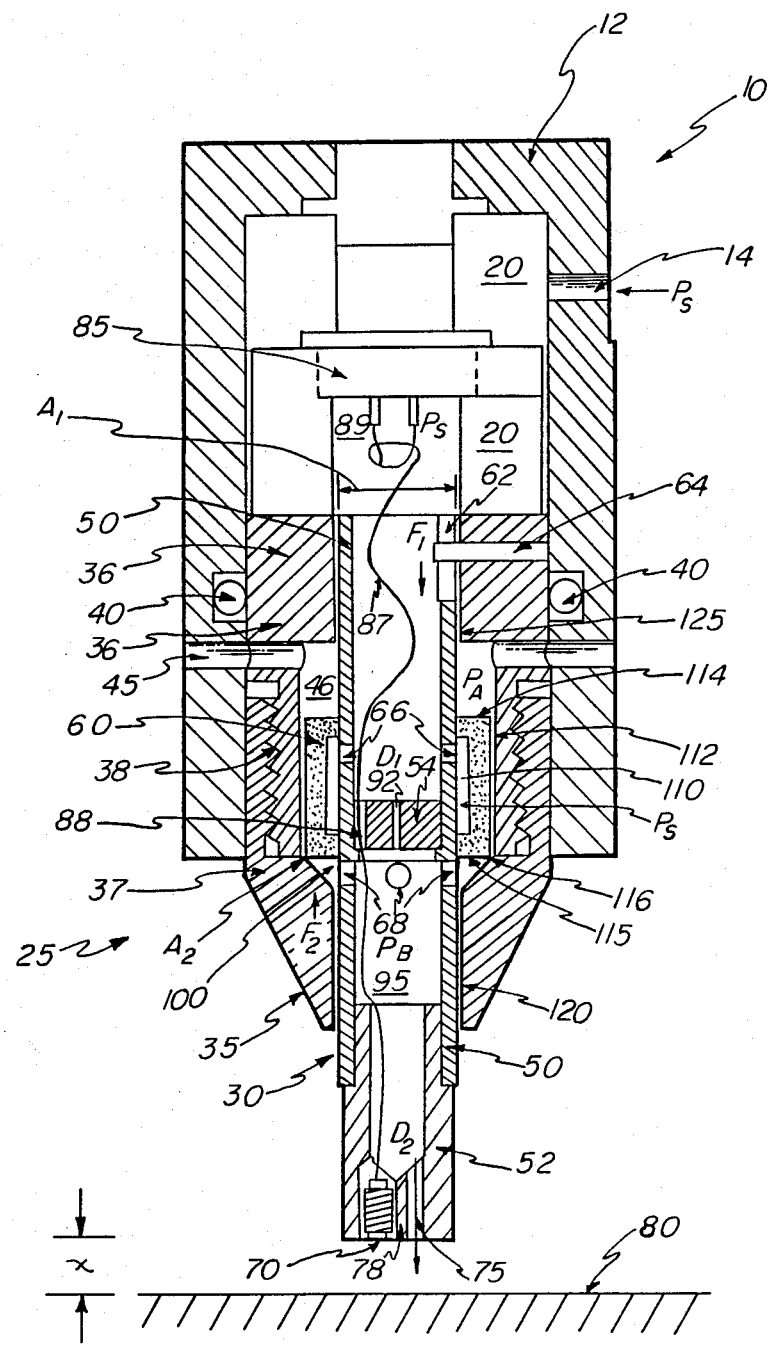
FIG. 1 is a cross-sectional elevational view of a pneumatic surface following probe constructed according to this invention.

Referring now to the drawings, and particularly to FIG. 1 which illustrates a preferred embodiment of the invention, the apparatus includes a hollow housing 10 which is preferably cylindrical in configuration. The housing has a closed upper end 12 in which is formed a passageway 14 through which gas, such as air under pressure, is introduced into the hollow interior of the housing, designated hereinafter as a first chamber 20. Typically, the pressure introduced through the passageway 14 will be in the range of 25–35 lbs. per square inch.

An insert assembly 25, installed at the lower end of the housing, includes a movable probe assembly or piston 30 and a cylinder assembly 35. The cylinder assembly 35 is formed in two parts, an upper section 36 and a lower section 37 which are threaded together at 38. As will be seen, this construction is necessary to permit the piston 30 to be installed within the cylinder assembly 35.

The outside diameter of the cylinder assembly 35 closely matches the inside diameter of the housing 10. An "O" ring 40 is placed between the upper section 36 and the housing 10 to insure that air introduced into the housing under pressure does not leak past the cylinder assembly.

Exhaust ports 45 extend through both the housing 10 and the cylinder assembly 35 to vent to the ambient air in the chamber 46 formed between the cylinder assembly and the piston.

The piston 30 includes an elongated cylindrical tube 50, a lower end or probe section 52, an intermediate member 54, and a main bearing member 60.

The elongated tube 50 has a diameter A and extends substantially the length of the cylinder assembly 35. This tube has a slot 62 cut in its upper end, and a pin 64 extends from the upper section 36 into this slot. This pin prevents the tube from rotating and at the same time limits the upward movement of the tube. A plurality of openings or ports are formed in the tube at 66 and 68, as will be explained.

The lower end or probe section 52 is an extension of the tube 50 and includes an eddy circuit sensing coil 70 and means forming an opening or sensing port 75 through which air is directed toward the surface of the workpiece 80.

Electrical connection between the eddy circuit coil 70 and a connector 85 mounted in the upper portion of the housing is provided by means of wires 87 which extend through an opening 88 formed in the intermediate member 54. This opening is filled with a sealant. Wires 87 are small diameter wires, and a coil 89 is formed at their upper end, near the connector 85, to insure that the wires do not interfere in any way with the free movement of the piston 30. In other words, care is taken to insure that the wires 87 exhibits a substantially zero spring constant.

The intermediate member 54 is placed between the ports 66 and 68 approximately midway in the cylindrical tube 50. An orifice 92 of fixed diameter D1 permits air to pass from the housing into a plenum 95 formed between the upper and lower end members 52 and 54 and permits the pressure in the plenum 95 (Pb) to be different from the pressure in the chamber 20 (Ps).

An orifice 75 of fixed diameter D2 is formed in the lower end section 52 with the axis of the opening parallel the axis of the piston to form the sensing port so that air passing through this opening is directed at the workpiece 80. The sensing port 75 (D2) is larger than the orifice 92 (D1), and it is not necessarily centered on the lower surface 78. Back pressure resulting from the proximity of the workpiece 80 will cause the pressure in the plenum 95 and a second chamber 100 to be a function of the distance x between the probe's lower surface or end 78 and the workpiece 80.

The bearing member 60 is formed from a cylindrical section of porous graphite, such as type AXF-5Q ultrafine graphite sold by Poco Graphite, Inc. A cavity 110 is machined in the interior portion of the bearing. Air entering into this cavity through ports 66 will seep through the bearing member into a gap 112 formed between the outer surface of the bearing member and the inner surface of the cylinder member. The ends 114 and 115 of the bearing member 60 are sealed to force the air to seep radially outwardly. The bearing member 60 is preferably attached to the tube 30 by an adhesive, and this adhesive may also be used to seal the ends thereof. The outer or bearing surface of the bearing member is normally machined to its final diameter after being bonded to the tube 30.

The downward movement of the piston is limited by the interaction between the bearing member 60 and the conical inner surface 116 of the lower section 37 of the cylinder assembly 35. The upward movement of the piston is limited by the pin 64. This range of movement of the piston 30 defines the control range of this device.

A supply of air at constant pressure Ps is ported through opening 14 into an upper or first chamber 20 and acts on a first surface of area A1 to create a force $F1=PsA1$. The first surface area A1 includes the end of the tube 50 and the area of the intermediate member 54. This is essentially the diameter of the tube 50 less the area of the orifice 92 (D1). Force F1 pushes piston 30 in the downward direction, as viewed in the drawings. It is to be understood, however, that the orientation of the device is not critical, and may be place in any position with respect to the horizon without affecting the operation thereof.

A lower or second chamber 100 is formed between the cylinder assembly 35 and the piston 30, and the air or gas at pressure Pb in the plenum 95 in the lower portion of the piston communicates with this chamber through ports 68 so that the plenum and the second chamber are at substantially equal pressure. The annular lower portion 115 of the bearing member 60 is a second surface having an area A2 that is larger than the area A1.

As the distance x decreases, back pressure Pb increases. Back pressure Pb is ported through openings 68 into the second chamber 100 and acts with area A2 to create an upwardly acting force $F2=PbA2$. When x approaches the value $\sim 0.002$ inches, $Pb \sim = Ps/2$. If $A2=2A1$, then $F2=PbA2=(ps/2)2A1=PsA1$, or
$F2=F1$ and a force balance condition is achieved in which piston 30 floats over the surface 80 at a constant distance x. If the surface 80 is raised, piston 30 will be raised the same amount.

The range of motion of piston 30 is not critical. If the surface 80 is raised far enough with respect to the housing 10, which remains fixed in space, piston 30 is pushed against mechanical stop or pin 64. The distance between stops 64 and 116 defines the range of the control system.

The absolute value of supply pressure Ps is not critical. A range from 25 to 35 lbs/in$^2$ provides suitable operation. The diameters of the orifice D1 and nozzle D2 are not very critical. The main requirement is that the nozzle diameter D2 must be larger than the orifice diameter D1 for proper operation. This relationship determines the gain, linearity, and operating distance x. In the preferred embodiment, the probe has the following dimensions: D1 is 0.019", D2 is 0.036", A1 is 0.027", and A2 is 0.067".

Figure 2:
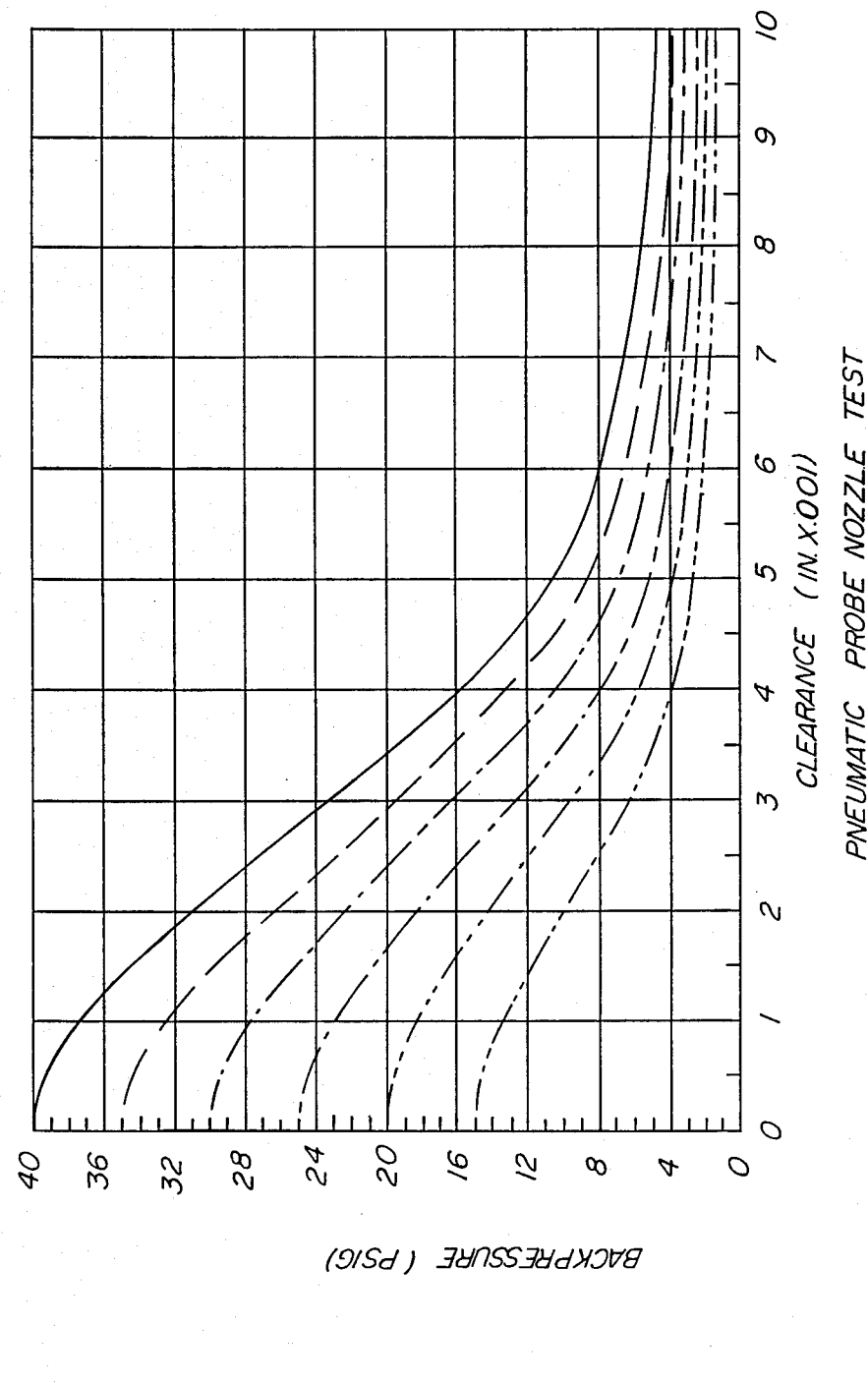
FIG. 2 is a family of curves showing the back pressure within the piston as a function of the distance of the probe from a workpiece for various supply pressures.

As the surface 80 is raised against nozzle D2 of piston 30, opposition of the air flow through the nozzle increases. This results in an increase in back pressure Pb. If the nozzle is completely closed by surface 80 (x=0) back pressure Pb approaches the supply pressure Ps. If the surface 80 is lowered (x large), no restriction to the air flow occurs in D2 and back pressure Pb approaches an ambient pressure Pa. A family of curves of back pressure as a function of x for various values of supply pressure Ps is shown in FIG. 2.

Clearances between piston 30 and the cylinder assembly 35 are somewhat critical and require tight tolerances. Since piston 30 must slide freely inside cylinder 35, some air will flow through the gaps identified as 112, 120 and 125. It is assumed that this air leakage forms an air-bearing and lowers the friction between the piston 30 and the cylinder assembly 35. Exhaust holes 45 are provided to allow the leakage from gaps 112 and 125 to escape to atmosphere resulting in a pressure Pa in the chamber 46 on the backside or surface 114 of the bearing 60, allowing the force F2 to be fully operational against force F1.

To reduce friction to a minimum, a porous media is used for the bearing 60. With Ps supplied to the inside of the porous media through openings 66, the air flows through the bearing an into the gap 112, creating an air-bearing. The ends 114 and 115 of the porous bearing are sealed to prevent flows into chambers 110 and 46 and to force the air flow radially through the bearing interface 112.

Since the mass of the piston 30 is small compared with the forces acting on the surfaces A1 and A2, the response time in repositioning the piston in response to a change in the location of the workpiece will be quite rapid.

While the form of apparatus herein described constitutes a preferred embodiment of the invention, it is to be understood that the invention is not limited to this precise form of apparatus and that changes may be made therein without departing from the scope of the invention.

What is claimed is:

1. Apparatus for maintaining the end of a probe a predetermined distance from a workpiece, said apparatus comprising
    a hollow housing including means for forming first and second chambers therein and means for introducing a gas under pressure into said first chamber,
    a piston positioned within said housing, said piston having one end thereof provided with a first surface having a first area exposed to said first chamber, whereby the pressure of the gas in said first chamber acts on said first area to urge the piston toward the workpiece,
    means forming an orifice between said first chamber and said second chamber for permitting a restricted flow of the gas to pass into said second chamber thereby permitting the pressures in said chambers to be different,
    means on said piston forming a second surface having a second area, larger than said first surface, exposed to the gas in said second chamber,
    means forming a sensing port at the probe end of said piston for directing a stream of the gas from said second chamber toward the workpiece whereby the pressure of gas in said second chamber will be function of the distance between the probe end of said piston and the workpiece,
    whereby the piston will assume a position within said housing where the force acting on the first surface balance the force acting on the second surface, thus maintaining the probe end of the piston a constant distance from the workpiece.

2. The apparatus of claim 1 further including means forming a plenum in said piston, and wherein said orifice is formed in said first surface.

3. The apparatus of claim 2 further including means forming an opening between said second chamber and said plenum for equalizing the gas pressure therebetween.

4. Apparatus for maintaining the end of a probe a predetermined distance from a workpiece, said apparatus comprising
    a hollow housing including means for forming first and second chambers therein and means for introducing a gas under pressure into said first chamber,
    a piston positioned within said housing, said piston having one end thereof provided with a surface having a first area exposed to said first chamber, whereby the pressure of the gas in said first chamber acts on said first area to urge the piston toward the workpiece
    means forming a plenum within said piston, and means forming an orifice between said plenum and said chamber for permitting a restricted flow of the gas into said plenum from said first chamber,
    means on said piston forming a surface having a second area exposed to said second chamber,
    means forming a passageway for equalizing the pressure between said plenum and said second chamber,
    means forming a sensing port at the probe end of said piston for directing a stream of the gas from said plenum toward the workpiece whereby the pressure of gas in said plenum and said second chamber will be a function of the distance that said probe end of said piston is from the workpiece,
    whereby the piston will be urged toward the workpiece by the pressure of the gas in the first chamber acting on said first surface and will be urged away from the workpiece by the pressure of the gas acting on said second area, whereby the piston will be maintained a constant distance from the workpiece substantially independently of the magnitude of the pressure of the gas source.

5. Apparatus for maintaining the end of a probe a predetermined distance from a workpiece, said apparatus comprising
    a housing including means for forming first and second chambers therein and means for introducing a gas under pressure into said first chamber,
    a piston positioned within said housing, said piston having one end thereof provided with a surface having a first area exposed to said first chamber, whereby the pressure of the gas in said first chamber acts on said first area to urge the piston toward the workpiece,
    means forming an orifice between said first chamber and said second chamber for permitting a restricted flow of the gas into said second chamber,
    a porus bearing member surrounding a portion of said piston and having a surface cooperating with said housing to form a gap therebetween,
    means for causing a portion of said gas to seep radially through bearing member into the gap formed between said piston and said housing to provide an air-bearing which supports the piston within the housing without contact therewith,
    means on said piston forming a surface having a second area exposed to said second chamber whereby the pressure of the gas in said second chamber acts to urge said piston away from the workpiece,
    means forming a sensing port at the probe end of said piston for directing a stream of the gas from said second chamber toward the workpiece whereby the pressure of gas in said second chamber ill be function of the distance that said probe end of said piston is from the workpiece,
    whereby the piston will be urged toward the workpiece by the pressure of the gas in the first chamber acting on said first surface and will be urged away from the workpiece by the pressure of the gas acting on said second area, and whereby the piston will be maintained a constant distance from the workpiece substantially independently of the magnitude of the pressure of the gas source.

6. The apparatus of claim 5 wherein said bearing member is cylindrical and wherein one end portion thereof forms at least a portion of said second surface, said apparatus further including means forming a chamber between said bearing member and said piston and means for introducing gas under pressure into said chamber, and means for sealing the ends of said bearing member whereby the gas under pressure will flow radially outwardly into the space between the outer surface of the bearing member and said housing.

* * * * *